UNITED STATES PATENT OFFICE 2,417,535

PRODUCTION OF TEXTILE MATERIALS WHICH ARE SENSITIVE TOWARDS WATER

John Guilfoyle Williams and Leonard Krause, London, England, assignors to British Celanese Limited, London, England, a company of Great Britain No Drawing. Application October 26, 1943, Serial No. 507,766. In Great Britain December 7, 1942

5 Claims. (Cl. 8—130)

This invention relates to the production of textile materials which are sensitive towards water, and in particular to the production of yarns and fabrics which combine a relatively high tensile strength in the dry state with a low or negligible tensile strength when wet with water.

According to the invention such water-sensitive textile materials are produced by subjecting textile materials made from organic esters of cellulose to treatment with an acid saponifying agent.

The textile materials treated by the new process may be filaments or yarns, but it is usually preferable to apply the process to fabrics, especially fabrics in a finished or substantially finished state, since when yarns are treated their sensitivity to water may cause difficulties in subsequent operations. The materials may have as a basis any organic ester of cellulose, particularly cellulose acetate.

As the saponifying agent it is preferred to use an inorganic acid, for instance sulphuric acid, and especially hydrochloric acid. The treatment may with advantage be carried out in the following operational steps: (I) application of the saponifying agent to the textile materials, (II) drying (in cases where the method or application, as set out below, renders this advisable), (III) allowing the saponifying agent to remain in contact with the materials until the particular properties desired have been imparted to the materials and (IV) neutralising or removing the acid saponifying agent remaining on the materials. In describing various methods of carrying out these operations, hydrochloric acid will be particularly referred to, but the methods can in principle be used with sulphuric acid or other acid saponifying agents.

In one method of carrying out the first operation the saponifying agent may be employed in aqueous solution; thus dilute aqueous solutions of hydrochloric acid, for example solutions of less than 10% concentration, may be applied to the materials. Concentrations between about 0.2% and 4%, especially concentrations in the neighbourhood of 0.5%, have proved particularly useful. The acid may be applied to the materials in any suitable way, for instance by padding, or by immersing the materials in or passing them through a bath containing the acid.

In another method, the hydrochloric acid or other acid saponifying agent may be used in solution in some other solvent; for example it may be dissolved in a mixture of a fairly volatile organic solvent and water, and such solutions have the advantage of more rapid drying. Good results may be obtained by using hydrochloric acid dissolved in aqueous ethyl alcohol or other lower aliphatic alcohol, and such solutions may be somewhat more concentrated than when aqueous solutions are used, or may be of similar concentrations to those set out above for aqueous solutions. For instance, a useful solution of the acid may be obtained by mixing concentrated (approximately 32%) aqueous hydrochloric acid with between about 1.5 and 4 times its volume of methylated spirit or other commercial form of ethyl alcohol; a 10% solution of hydrochloric acid in aqueous alcohol made in this way may be used with good results. The acid solution may be applied by methods similar to those adopted with aqueous solutions.

The conditions under which the saponifying agent is applied to the materials depend to a considerable degree on the method adopted. For example, the textile materials may be immersed for a short period, generally less than 15 or 10 minutes, and especially about 5 minutes, in a bath of 0.2 to 4% aqueous hydrochloric acid at room temperature, and then excess acid may be removed by pressing, centrifuging, or other means, leaving on the materials, for example, about their own weight of the solution. Similar conditions may be employed when an aqueous alcoholic solution of hydrochloric acid is used. Padding methods may also advantageously be carried out at room temperature, and generally should aim at leaving in the materials more or less the same quantity of acid solution of the concentration specified above, or rather less of more concentrated solutions, always provided that the amount of solution is sufficient to ensure that the saponifying agent is applied uniformly to the materials.

When the hydrochloric acid is applied in aqueous or aqueous alcoholic solution, a drying operation (apart from the removal of excess solution as already described) is of advantage, in order to concentrate the acid on the materials. The drying may be carried out in a single stage or in two or more stages. In the simplest method the materials may simply be left exposed to the air at a temperature up to about 25° C., for example at room temperature, for a period of say 12 hours or more. Quicker drying, readier control and easier disposal or recovery of any acid which may be evaporated, may be achieved by suspending the materials in a duct or the like through which is passed a current of air, which may or may not be heated, and of course aqueous alcoholic solutions of the acid dry more quickly, other things being equal, than aqueous solutions.

The third operational step in the treatment consists in allowing the hydrochloric acid or other acid saponifying agent to act on the materials to the particular degree desired. This may be done at ordinary or relatively low temperatures or, particularly if it is desired to hasten the reaction, at higher temperatures. If temperatures of about 30° C. are used, a very great diminution in the wet strength of the materials is produced after about five to ten days; at temperatures in the neighbourhood of 40° C. three to six days will in general suffice to produce a similar effect. Higher temperatures still may be used, and good results have been obtained by stove and stenter drying at temperatures of about 65° C. or higher, for correspondingly shorter periods.

It is of course necessary that this third operational step be carried out under conditions such that substantial amounts of the acid saponifying agent are not lost. Thus when a relatively volatile agent such as hydrochloric acid is used, the materials must be kept in a closed space if high temperatures are to be used, and indeed this is advisable even at temperatures as low as 25°–30° C. or down to room temperatures. It is also preferable to maintain in the atmosphere a relative humidity of about 100%, and this may conveniently be done by having present water in an open dish or other container.

In place of the three operational steps described above, the materials may be given a unitary treatment with a vapour of an acid saponifying agent, for example moist hydrogen chloride gas. Thus, for example, cellulose acetate fabrics may be suspended in the vapours of concentrated hydrochloric acid. The treatment may be effected at room temperature, but a much more rapid action results from the use of higher temperatures, e. g., temperatures between about 50° and 80° C.; thus the fabric may be subjected to the action of the fumes for a period of the order of 60 minutes at 50° C., or for about 15 minutes at 80° C.; above this temperature the difficulty of accurately controlling the degree of action of the acid on the material increases very considerably, and even at lower temperatures the treatment is more difficult to control than when using the methods previously described.

When the action of the acid saponifying agent has gone sufficiently far, the acid remaining on the materials must be neutralised and/or removed, and this constitutes the last operational step of the new process. Since the materials are now sensitive to water, it is generally speaking advisable to carry out the neutralisation and/or removal of the acid in the substantial absence of water. When a volatile acid, for example hydrochloric acid, has been used, at least a proportion thereof may be removed by evaporation; thus materials which have been treated with, and still contain, hydrochloric acid may be subjected to a current of either cool or, preferably, heated air. However, it is not usually practicable or convenient to remove all traces of the acid in this way, and of course if non-volatile acid saponifying agents, e. g. sulphuric acid, are used, the evaporation method is not suitable. In such cases good results are obtained by allowing the materials to stand in an atmosphere of a volatile base, preferably substantially dry ammonia gas, for example for between 20 minutes and 3 or 5 hours; advantageously such atmosphere may be kept in a state of continuous movement, for example by means of an electric fan, or for example the materials may be suspended across a suitable duct or the like, and ammonia gas passed continuously, if desired in a circuit, through the materials until the acid contained on them has been substantially completely removed and/or neutralised.

Throughout the process it is important, if consistent results and a uniform product are desired, to maintain a strict control over all the treatment conditions. The precise conditions required in any particular case will depend on the nature of the starting materials and the exact properties which are to be imparted to them. Once these conditions have been determined for a given starting material and final desiderata they should be very closely adhered to. By doing this it is possible to obtain, for example, uniform products having a relatively high dry tenacity and yet actually breaking down in the presence of water. Such materials are of particular value in parachutes used in mine laying, since in contact with sea or river water the materials of the parachute will rapidly gelatinise and be dispersed, and so will not remain as a more or less permanent indication of the existence and position of the mine.

The invention is not confined to the production of fabrics which are wholly water-sensitive. For example, the saponification treatment can be applied to fabrics and the like made up of two or more components, at least one of which can be saponified by the process of the invention, while another component is not so affected. For example, a fabric having a cellulose acetate warp and regenerated cellulose weft, or a regenerated cellulose warp and a cellulose acetate weft, can be treated. Similarly the treatment, whether affecting the whole or part of a fabric, need not be carried so far that the product is substantially destroyed by water; it may for instance be made sensitive only to such a degree that it is swollen and/or shrunk by water. Moreover, the process may be applied to selected areas only of a fabric; for instance the saponifying agent may be padded on to certain areas only, or parts of a fabric or other material may be protected by a resistant coating before the application of the saponifying agent.

The following examples illustrate the invention without limiting it in any way.

*Example I*

A cellulose acetate fabric is immersed for five minutes in a 0.5% solution of hydrochloric acid, and is then removed from the solution, squeezed until it contains its own weight of the solution, and hung at room temperature overnight. It is then placed in a chamber which is held at a temperature of 37° C. and which contains a small amount of water in an open vessel in order to maintain in the chamber a relative humidity of 100%. After four or six days the fabric is removed from the chamber and hung for 24 hours, whereby part of the hydrochloric acid remaining on the fabric, and of the acetic acid produced by the hydrolysis, are removed by evaporation, and is then exposed to a high concentration of ammonia gas for 30 minutes. Fabrics treated for 4 days still have a relatively high dry strength but a negligible wet strength; fabrics treated for 6 days have a somewhat lower dry strength, and their wet strength is so low that they are gelled by contact with cold water and rapidly broken up by agitation.

Example II

A cellulose acetate fabric is suspended in a closed vessel over concentrated hydrochloric acid heated to 80° C. After 15 minutes the fabric is removed, hung for 24 hours at room temperature in a slow current of air, and then exposed to a high concentration of ammonia gas for 30 minutes. The dry strength of the fabric is considerably reduced by this treatment, and its wet strength is rendered negligible. By treating the initial fabric for 60 minutes over concentrated hydrochloric acid at 50° C. a negligible wet strength is again obtained, but with a somewhat higher dry strength than when the treatment is effected at the higher temperature.

Having described our invention, what we desire to secure by Letters Patent is:

1. Process for the manufacture of textile materials having a very low wet strength and a substantial dry strength, which comprises applying to a textile fabric having a basis of an organic ester of cellulose, a solution of concentration below 10% of a strong mineral acid selected from the group which consists of hydrochloric and sulphuric acids in an aqueous solution therefor, concentrating the acid solution on the fabric, allowing the fabric while wet with the acid solution to stand in air which is saturated with water vapor until the wet strength of the fabric has been reduced to the desired very low value, and then freeing the fabric from the acid.

2. Process for the manufacture of textile materials having a very low wet strength and a substantial dry strength, which comprises applying to a textile fabric having a basis of cellulose acetate a 0.2 to 4% aqueous solution of hydrochloric acid, concentrating the acid on the fabric by evaporating water therefrom at a temperature below 25° C., allowing the fabric while wet with the acid solution to stand in air which is saturated with water vapor until the wet strength of the fabric has been reduced to the desired very low value, and then freeing the fabric from the acid.

3. Process for the manufacture of textile materials having a very low wet strength and a substantial dry strength, which comprises applying to a textile fabric having a basis of cellulose acetate a 0.2 to 4% aqueous solution of hydrochloric acid, concentrating the acid on the fabric by evaporating water therefrom at a temperature below 25° C., allowing the fabric while wet with the acid solution to stand in air which is saturated with water vapor at a temperature of 30 to 40° C. for a period ranging from 5 to 10 days at 30° C. to 3 to 6 days at 40° C., and then freeing the fabric from the acid.

4. Process for the manufacture of textile materials having a very low wet strength and a substantial dry strength, which comprises applying to a textile fabric having a basis of cellulose acetate a 0.2 to 10% aqueous alcoholic solution of hydrochloric acid, concentrating the acid on the fabric by evaporating water therefrom at a temperature below 25° C., allowing the fabric while wet with the acid solution to stand in air which is saturated with water vapor until the wet strength of the fabric has been reduced to the desired very low value, and then freeing the fabric from the acid.

5. Process for the manufacture of textile materials having a very low wet strength and a substantial dry strength, which comprises applying to a textile fabric having a basis of cellulose acetate a 0.2 to 4% aqueous alcoholic solution of hydrochloric acid, concentrating the acid on the fabric by evaporating water therefrom at a temperature below 25° C., allowing the fabric while wet with the acid solution to stand in air which is saturated with water vapor at a temperature of 30 to 40° C. for a period ranging from 5 to 10 days at 30° C. to 3 to 6 days at 40° C., and then freeing the fabric from the acid.

JOHN GUILFOYLE WILLIAMS.
LEONARD KRAUSE.

REFERENCES CITED

The following references are of record in the file of this patent:

UNITED STATES PATENTS

| Number | Name | Date |
|---|---|---|
| 1,061,771 | Mork | May 13, 1913 |
| 1,074,092 | Mork | Sept. 23, 1913 |
| 1,778,327 | Lardy | Oct. 14, 1930 |
| 2,002,083 | Dreyfus | May 21, 1935 |
| 2,053,767 | Dreyfus | Sept. 8, 1936 |
| 2,129,052 | Fordyce | Sept. 6, 1938 |
| 981,574 | Knoevenagel | Jan. 10, 1911 |
| 1,903,290 | Dreyfus | Apr. 4, 1933 |

FOREIGN PATENTS

| Number | Country | Date |
|---|---|---|
| 20,672 | British | A. D. 1910, Feb. 9, 1911 |
| 318,468 | British | Sept. 4, 1930 |
| 324,662 | British | Jan. 29, 1930 |